UNITED STATES PATENT OFFICE.

NORVAL WATSON HELME, RICHARD STOCKDALE, AND ROBERT NEWTON HELME, OF LANCASTER, ENGLAND.

COMPOSITION FOR THE TREATMENT OF PAPER-HANGINGS.

SPECIFICATION forming part of Letters Patent No. 407,008, dated July 16, 1889.

Application filed January 25, 1888. Serial No. 261,904. (No specimens.) Patented in England April 7, 1887, No. 5,171; in France January 14, 1888, No. 188,139; in Belgium January 16, 1888, No. 80,289, and in Canada June 25, 1888, No. 29,394.

*To all whom it may concern:*

Be it known that we, NORVAL WATSON HELME, RICHARD STOCKDALE, and ROBERT NEWTON HELME, all of Lancaster, in the county of Lancaster, England, and subjects of the Queen of Great Britain and Ireland, have invented Improvements in Compositions for the Treatment of Paper-Hangings, (for which we have obtained British patent, No. 5,171, dated April 7, 1887; French patent, No. 188,139, dated January 14, 1888; Belgian patent, No. 80,289, dated January 16, 1888; Canadian patent, No. 29,394, dated June 25, 1888,) of which the following is a specification.

The objects of this invention are to give greater strength, durability, and body to the paper than heretofore obtainable; to enable it to resist damp and to bear washing when unvarnished, and also to enable it to receive and support a varnish without first applying a coat of size, as usually practiced. We propose to effect these objects by applying to the surface of the paper a composition or medium hereinafter specified, and then we either emboss the same or print thereon by any known method by pigments or other suitable substances mixed in oil, varnish, or other suitable medium, or in gold-size or the like. The composition which we employ for this purpose is made by mixing to a proper consistency for spreading the following ingredients, namely: first, boiled oil; second, china-clay, whiting, chalk, or other suitable earthy matters, together with lamp-black and the like mixed with water, or lead or other paints or pigments mixed with turpentine, petroleum, or other suitable vegetable or mineral spirits as a vehicle; third, farinaceous or mucilaginous matters—such as starch, Irish moss, and glue or other similar animal matters—dissolved in water; fourth, aqueous solution of borax or other alkalies, either caustic or carbonated, to cause the mucilage and oil to combine and form a saponaceous emulsion. These ingredients may be used in varying proportions or quantities to suit different qualities of paper and to meet the various circumstances under which the paper-hanging may be required to be used; but for ordinary purposes we have found the following proportions to give satisfactory results.

The various coats of the composition may be applied by means of an ordinary coating or spreading machine provided with a roller and knife or doctor, or by any other similar machine, or by hand, if preferred, and the surface should be well dried between each coating—for the first coat, say, about one pound of boiled oil, two ounces of starch or other farinaceous matter, or glue or other similar animal matter, dissolved in water and thickened or reduced to the required consistency by boiling or otherwise, three pounds of clay, whiting, or other suitable earthy matter soaked in water, and one ounce of dissolved carbonate of soda or other suitable alkali to cause the ingredients to blend with the oil, adding a little water or turpentine, petroleum, or other vegetable or mineral spirit to bring it to the required consistency.

The following coats may be of a similar nature, either with or without the farinaceous and animal matters; if without, then lessening the amount of alkali and increasing the proportion of boiled oil or of the clay and adding any suitable coloring-matter to give the tint required.

This composition when dry resists damp and is perfectly washable, and may be ornamented in any of the ways above mentioned, and may, if required, be varnished without the necessity of previously sizing or other preparation.

We claim as our invention—

1. The composition for the preparation or treatment of paper-hangings, comprising boiled oil, a suitable alkali, mucilaginous matter, an earthy matter—such as china-clay—a pigment, and a vehicle, all in substantially the proportions herein described.

2. The herein-described composition for the preparation or treatment of paper-hangings, comprising boiled oil, an earthy matter—such as china-clay—and a suitable alkali and vehicle.

In testimony whereof we have signed our names to this specification in the presence of two subscribing witnesses.

NORVAL WATSON HELME.
    RIC. STOCKDALE.
    ROBERT NEWTON HELME.

Witnesses:
 CHAS. BENTLEY,
 HY. GILL.